(12) United States Patent
Chuang

(10) Patent No.: US 9,827,615 B2
(45) Date of Patent: Nov. 28, 2017

(54) FLOAT TYPE CLAMPING MECHANISM

(71) Applicant: Hsu-Pin Chuang, Tainan (TW)

(72) Inventor: Hsu-Pin Chuang, Tainan (TW)

( * ) Notice: Subject to any disclaimer, the term of this patent is extended or adjusted under 35 U.S.C. 154(b) by 76 days.

(21) Appl. No.: 14/964,901

(22) Filed: Dec. 10, 2015

(65) Prior Publication Data

US 2017/0165801 A1   Jun. 15, 2017

(51) Int. Cl.
*B23Q 1/00* (2006.01)
*B23B 31/107* (2006.01)
*B23B 31/02* (2006.01)

(52) U.S. Cl.
CPC ........ *B23B 31/028* (2013.01); *B23B 31/1071* (2013.01); *B23Q 1/0072* (2013.01); *B23B 31/107* (2013.01); *B23B 31/1078* (2013.01); *Y10T 279/1291* (2015.01); *Y10T 279/17752* (2015.01); *Y10T 279/17811* (2015.01)

(58) Field of Classification Search
CPC .............. B23B 31/107; B23B 31/1071; B23B 31/1078; B23Q 1/0072; Y10T 279/17743; Y10T 279/17752; Y10T 279/17811; Y10T 279/1291
See application file for complete search history.

(56) References Cited

U.S. PATENT DOCUMENTS

| | | | | |
|---|---|---|---|---|
| 2,386,469 | A * | 10/1945 | Iversen | B23B 31/02 |
| | | | | 279/74 |
| 6,273,434 | B1 * | 8/2001 | Stark | B23B 31/1071 |
| | | | | 269/309 |
| 2009/0051094 | A1 * | 2/2009 | Sandmeier | B23B 31/1078 |
| | | | | 269/258 |
| 2015/0190895 | A1 * | 7/2015 | Canuto | B23Q 3/103 |
| | | | | 269/296 |
| 2015/0306677 | A1 * | 10/2015 | Lin | B23B 31/1071 |
| | | | | 279/4.06 |

FOREIGN PATENT DOCUMENTS

| | | | | |
|---|---|---|---|---|
| DE | 19636375 A1 | 12/1998 | | |
| DE | 102004020228 A1 * | 11/2005 | ......... | B23B 31/1071 |
| JP | 2003-200326 A | 7/2003 | | |
| TW | 592882 B | 6/2004 | | |
| TW | I432282 B | 4/2014 | | |
| TW | I455790 B | 10/2014 | | |
| WO | WO 2006038848 A1 * | 4/2006 | ......... | B23B 31/1071 |

* cited by examiner

*Primary Examiner* — Eric A Gates
*Assistant Examiner* — Chwen-Wei Su
(74) *Attorney, Agent, or Firm* — Rosenberg, Klein & Lee

(57) ABSTRACT

A float type clamping mechanism is provided, comprising a workpiece pallet having a central post provided on its bottom surface and a chuck. The chuck can be releasably coupled to the central post. The chuck has a base, a top seat, a piston seat with spring members provided between the piston seat and the top seat, a movable socket having movable detents provided around its periphery, and a bottom cover. When the central post of the workpiece pallet is inserted into the movable socket, the movable detents displaced inward to detent the central post so as to allow the movable socket to float upward slightly, and the movable socket is pressed downward through simple mechanism to clamp the central post firmly so that zero clamping effect between the workpiece pallet and the chuck can be achieved.

5 Claims, 10 Drawing Sheets

FLOAT TYPE CLAMPING MECHANISM

BACKGROUND OF INVENTION

Field of the Invention

The present invention relates to a float type clamping mechanism, more particularly to a float type clamping mechanism by which the workpiece pallet can be stably clamped without shaking happened, so as to ensure machining precision of the workpiece in processing.

Brief Description of Prior Art

For semi-automatic or fully automatic machining operation, whether carrier loaded with workpiece can be releasably clamped on the position of a chuck accurately or not is very important. For example, if the workpiece supporting body is not accurately positioned on the chuck, there might be the danger of position deviation of the workpiece, and this may result in deviation or inaccuracy of workpiece dimension, of course this may cause extremely serious destruction.

Usually, this type of clamping mechanism is substantially one similar to a positioning means as in TW Patent Pub. No. I455790 B for positioning an object respectively in axial direction along X-axis, Y-axis perpendicular to X-axis, and Z-axis orthogonal to X-axis and Y-axis, and allows the object to be positioned on a plane parallel to X-axis and Y-axis and rotationally in Z-axial direction. A fastening member can releasably hold stationary member firmly in place. When the stationary axial rod of the stationary member is inserted into the fixing hole of the fastening member, a gap is formed between a first reference surface of the stationary member and a second reference surface of the fastening member, and the outer surface of the pyramid portion of the stationary axial rod is in fit connection with the inner surface of the fixing hole, and the object is positioned in X-axis and Y-axis directions. When the fastening portion of the fastening member pulls the stationary axial rod, the first reference surface and the second reference surface are contacted with each other so that the pyramid portion or the fixing hole generates elastic deformation. Further, the stationary axial rod is pulled further into the fixing hole so as to maintain the fit connection between the outer surface of the pyramid portion and the inner surface of the fixing hole.

Alternatively, this type of clamping mechanism is a fixture disclosed in TW Patent Pub. No. I432282 B, especially including a chuck having a locking mechanism for positioning a workpiece pallet by a releasable method. Instead, this type of clamping mechanism can be a rapidly releasable workpiece jig disclosed in Germany Patent DE 196 36 375 A1; or a clamping device disclosed in TW Patent Pub. No. 592882 B [JP 2003200326 A], comprising a clamping chuck and a workpiece supporting body which is releasably mounted on the clamping chuck, the workpiece supporting body including a flat bottom surface and a clamping pin extending from the flat bottom surface; the clamping chuck including a central opening for receiving the clamping pin of the workpiece supporting body and a conical insertion part; the clamping pin including at least one surface part, in which the shape of the surface part corresponds to the shape of the conical insertion part so as to correct the position of the clamping pin in X and/or Y direction; the clamping chuck further including a clamping mechanism for clamping the clamping pin of the workpiece supporting body in the central opening, and at least one surface part serving as a fastening member in Z direction, characterized in that the clamping pin is marked with inscription of dimension, before starting the clamping mechanism, a gap may exist between the flat bottom surface of the workpiece supporting body and the surface part of the clamping chuck serving as the fastening member in Z direction; after the clamping pin of the workpiece supporting body is inserted into the central opening of the clamping chuck and the at least one surface part of the clamping pin is engaged into the conical insertion part of the central opening, the position of the clamping pin with respect to the clamping chuck in X and/or Y direction is corrected; once the clamping mechanism is started, the clamping pin and/or the region around the central opening of the clamping chuck are elastically deformed so as to pull the clamping pin further into the central opening, simultaneously the workpiece supporting body moves toward the surface part serving as the fastening member in Z direction until the flat bottom surface of the workpiece supporting body rests on the surface part of the clamping chuck serving as the fastening member in Z direction.

It can be understood from the above prior art that ordinary clamping equipment is mainly to be designed whether the workpiece support body (pallet) is accurately locked/released or not. However, when workpiece needs more precise dimensions, the workpiece support body (pallet) should be kept in unshaking status when in machining. Thus, the workpiece support body (pallet) and the clamping equipment further need high-precision combination design in addition to clamping. Therefore, when producing clamping equipment or workpiece support body (pallet), the combination precision of these two relative to each other should be kept below the range of 0.01 mm. In consequence, this manufacturing process may result in cost increase, time and labor consuming and high failure rate, and then service life is short and elimination rate is also high.

SUMMARY OF THE INVENTION

The main object of the present invention is to provide a float type clamping mechanism, more particularly to a float type clamping mechanism by which the workpiece pallet can be stably clamped without shaking happened, so as to ensure machining accuracy of the workpiece in processing.

The object and effect of the float type clamping mechanism of the present invention is achieved by the following specific technical means.

The floating type clamping mechanism of the present invention mainly has a workpiece pallet and a chuck, and a central post is provided on the bottom surface of the workpiece pallet. The chuck can be releasably coupled to the central post of the workpiece pallet, wherein the chuck comprises: a base with an action chamber formed at its center; a top seat correspondingly fastened to the open end of the base; a piston seat provided within the action chamber of the base; several spring members provided round the center of piston seat and between the piston seat and top seat for push against the piston seat; a movable socket provided within the central aperture of the piston seat, the movable socket having an inclined annular surface provided on the top outside thereof and being limited on an opening of the bore of the top seat; a plurality of movable detents capable of horizontal displacement being provided in the periphery of the movable socket; and a bottom cover provided on the bottom of the piston seat. In this manner, the central post of the workpiece pallet is inserted into the movable socket, and then the movable detents displace inward so as to detent the central post and simultaneously to allow the movable socket floating upward. Next, the annular surface of the movable socket interacts with the opening of the top seat, so that the movable socket is pressed downward to clamp the central post firmly. Therefore, zero clamping effect between the workpiece pallet and the chuck can be achieved.

According to the above floating type clamping mechanism of the present invention, an engaging bevel surface is provided on the head part of the central post for engaging with the movable detents, and an action annular surface is provided on central post close to the bottom face of the workpiece pallet.

According to the above floating type clamping mechanism of the present invention, the top seat has a bore provided to communicate with the action chamber and an abutting annular surface is formed in an inner ring surface of the opening of the bore. When the movable socket floats upward, the annular inclined surface can abut against the corresponding abutting annular surface, and then the movable socket will pull the central post downward to clamp.

According to the above floating type clamping mechanism of the present invention, an aperture is provided at the center of the piston seat and several receiving cavities are provided around the aperture. Each receiving cavity has a spring member mounted therein which correspondingly pushes against the top seat. The piston seat can be driven by power to interact with the spring members in such a manner that the piston seat can be displaced up and down within the action chamber.

According to the above floating type clamping mechanism of the present invention, grooves are provided respectively on the bottoms of the slots, while ridges corresponding to the grooves are provided respectively on the bottoms of the movable detents. In this way, smooth and horizontal displacement of the movable detents can be ensured by sliding action of the ridges on the grooves.

According to the above floating type clamping mechanism of the present invention, each of the movable detents has a first and a second inclined surfaces respectively formed on the upper and lower positions thereof. When the head of the central post is inserted into the movable socket, the central post can correspondingly push against the first inclined surface to force the movable detents moving backward. The second inclined surface is to engage with the engaging bevel surface of the central post and thereby to clamp the central post firmly.

According to the above floating type clamping mechanism of the present invention, the movable detent can be either sliding block or ball.

DETAILED DESCRIPTION OF PREFERRED EMBODIMENTS

Figure 1:
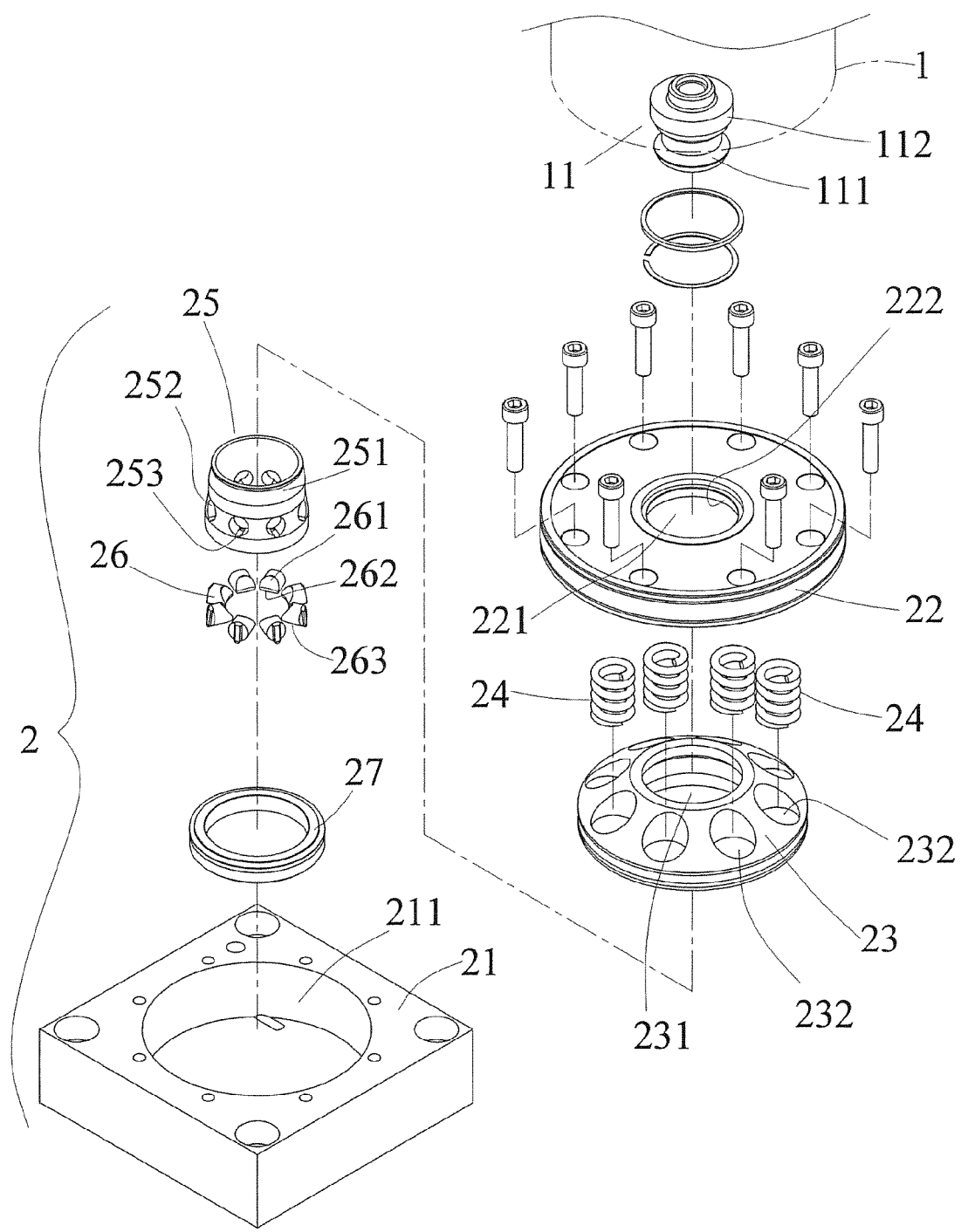
FIG. 1 is a schematic perspective exploded view of the embodiment (I) of the present invention.

FIG. 1 is a perspective exploded schematic view of the floating clamping mechanism of the present invention. As shown in this figure, the floating clamping mechanism of the present invention mainly has a workpiece pallet (1) for fixing workpiece thereon and a chuck (2). A central post (11) is provided on the bottom surface of the workpiece pallet (1), and the chuck (2) can be releasably coupled with the central post (11). The chuck (2) mainly comprising:

a base (21) with an action chamber (211) formed at its center;

a top seat (22) correspondingly fastened to the open end of the base (21), the top seat (22) having a bore (221) provided to communicate with the action chamber (211) and an abutting annular surface (222) being formed in an inner ring surface of an opening of the bore (221);

a piston seat (23) provided within the action chamber (211) of the base (21); an aperture (231) being provided at the center of the piston seat (23) and several receiving cavities (232) being provided around the aperture (231); each receiving cavity (232) having a spring member (24) mounted therein which correspondingly pushes against the top seat (22); the piston seat (23) being driven by power to interact with the spring members (24) in such a manner that the piston seat (23) can be displaced up and down within the action chamber (211);

a movable socket (25) provided within the central aperture (231) of the piston seat (23), the movable socket (25) being inserted by the central post (11) of the workpiece pallet (1); an inclined annular surface (251) being provided on the top outside of the movable socket (25) and being limited on the opening of the bore (221) of the top seat (22); a plurality of slots (252) being provided around the side wall of the movable socket (25) and movable detents (26), such as sliding blocks or balls, being provided respectively within the slots (252);

a bottom cover (27) correspondingly in press-fit at the bottom of the aperture (231) of the piston seat (23).

Figure 2:
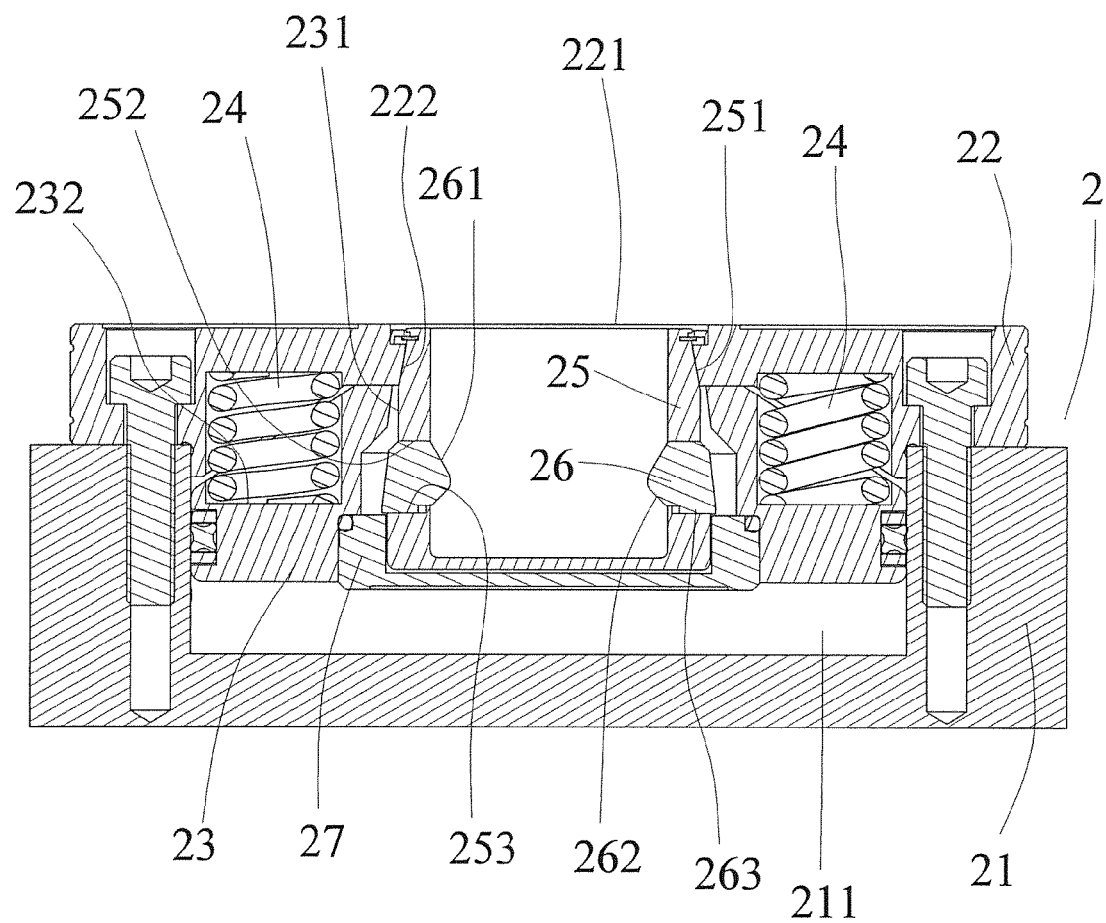
FIG. 2 is a schematic sectional view of the chuck of the embodiment (I) of the present invention.
Figure 3:
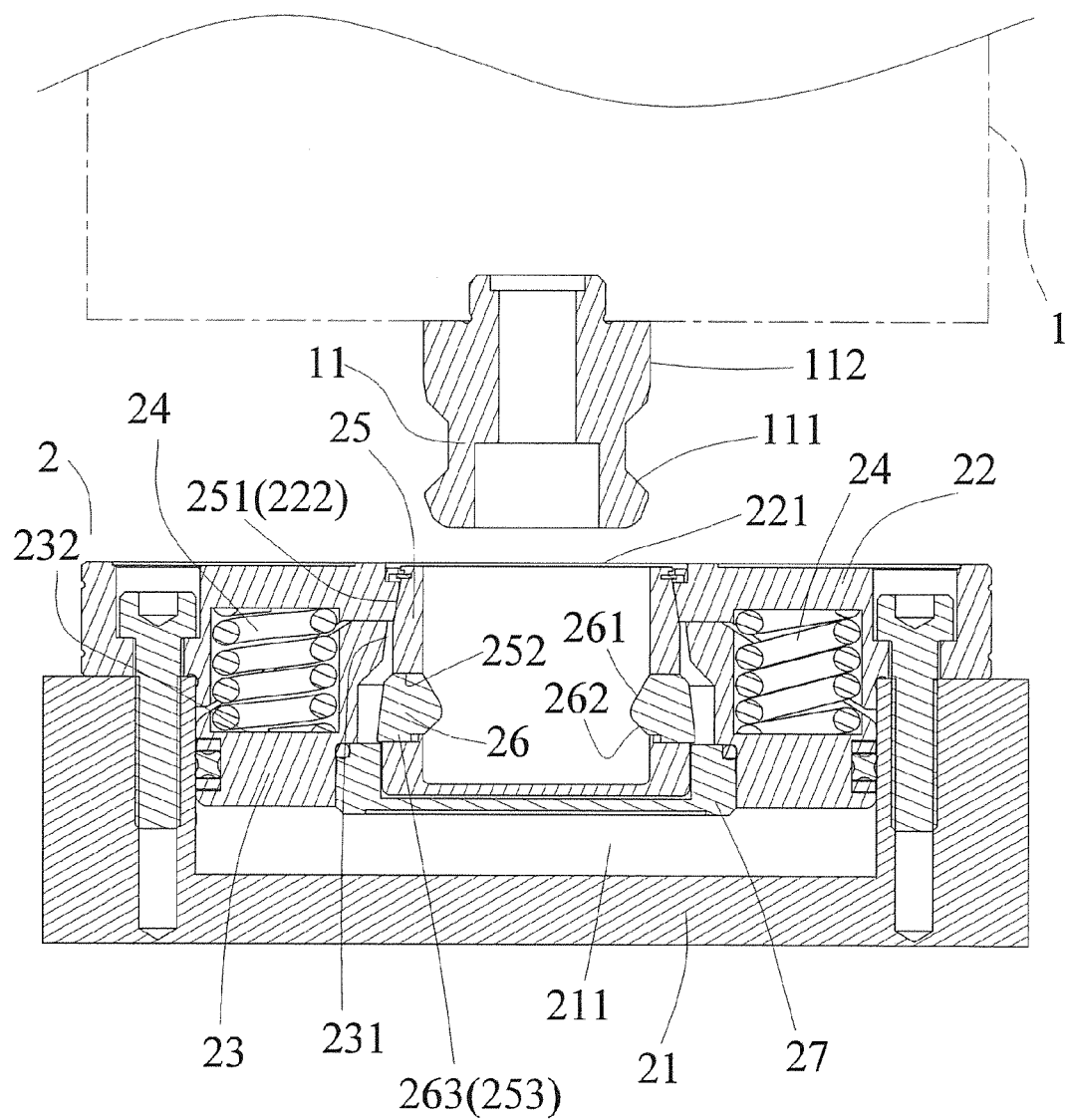
FIG. 3 is a schematic sectional view showing unassembled stated of the workpiece pallet and the chuck of the embodiment (I) of the present invention.
Figure 4:
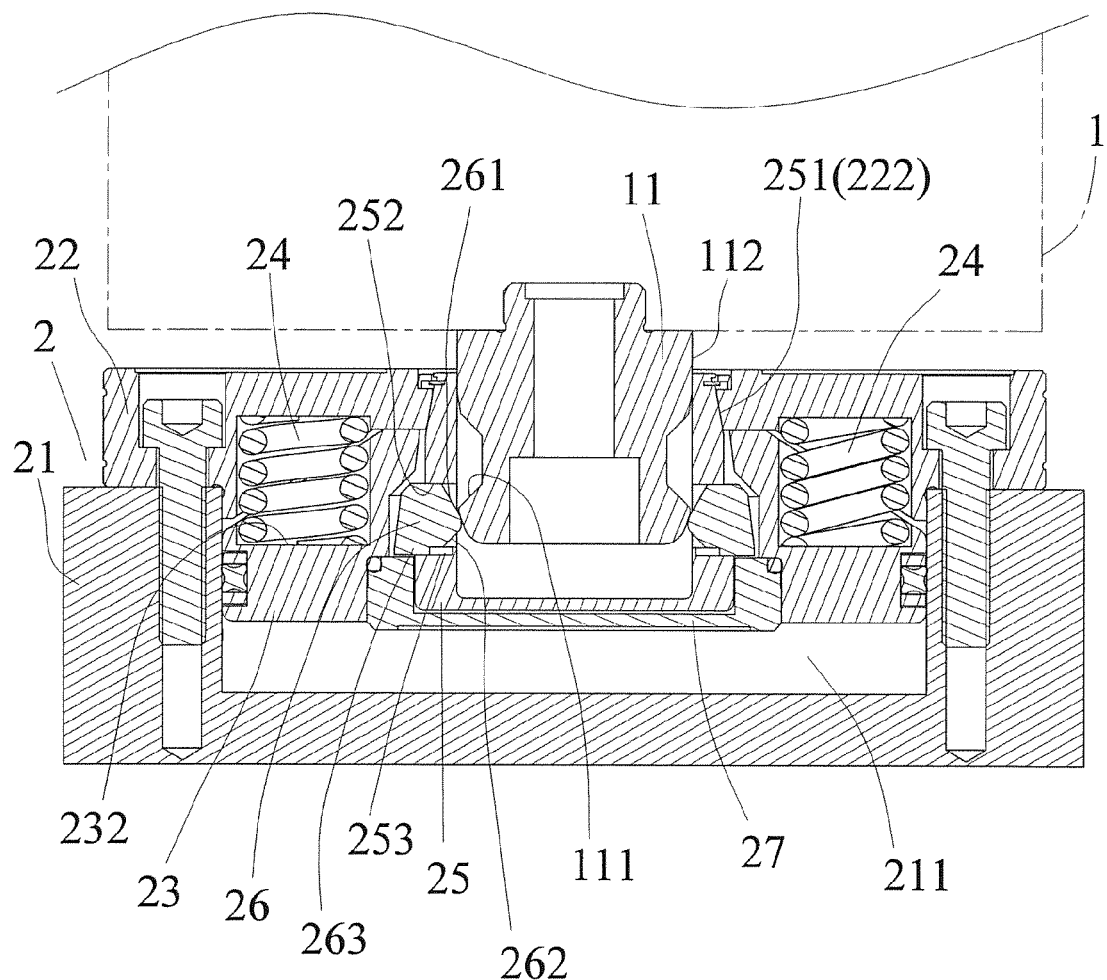
FIG. 4 is a schematic sectional view showing the action of inserting the workpiece pallet into the chuck of the embodiment (I) of the present invention.

Referring to FIGS. 1 to 6, there are two embodiments for the movable detent (26) of the present invention, which will be described respectively thereafter. Firstly, sliding block is employed as the movable detent (26) in the first embodiment, whereby good clamping effect can be achieved by the surface contact between the sliding blocks and a corresponding engaging bevel surface (111) of the central post (11). When in practical implementation, the central post (11) is generally in thread engagement with the bottom surface of the workpiece pallet (1). The engaging bevel surface (111) is provided on the head part of the central post (11) for engaging with the movable detents (26), and an action annular surface (112) is provided on the central post (11) near the bottom surface of the workpiece pallet (1). As shown in FIGS. 2 and 3, when the workpiece pallet (1) is not yet assembled with the chuck (2), the action chamber (211) within the base (21) of the chuck (2) is inputted with power (hydraulic oil) to push the piston seat (23) upward (i.e., normally open state). At this moment, the uprising movable seat (23) compresses the spring members (24) and detaches from the detention with the movable detents (26), so that the movable detents (26) on the movable socket (25) have spaces for displacement in the slots (252). As each of the movable detents (26) has a first and a second inclined surfaces (261), (262) respectively formed on the upper and lower sides thereof, the central post (11) can correspondingly push against the first inclined surface (261) under unconstraining state of the movable detents (26) so that the movable detents (26) are moved backward and fitted into the movable socket (25), as shown in FIG. 4.

Figure 5:
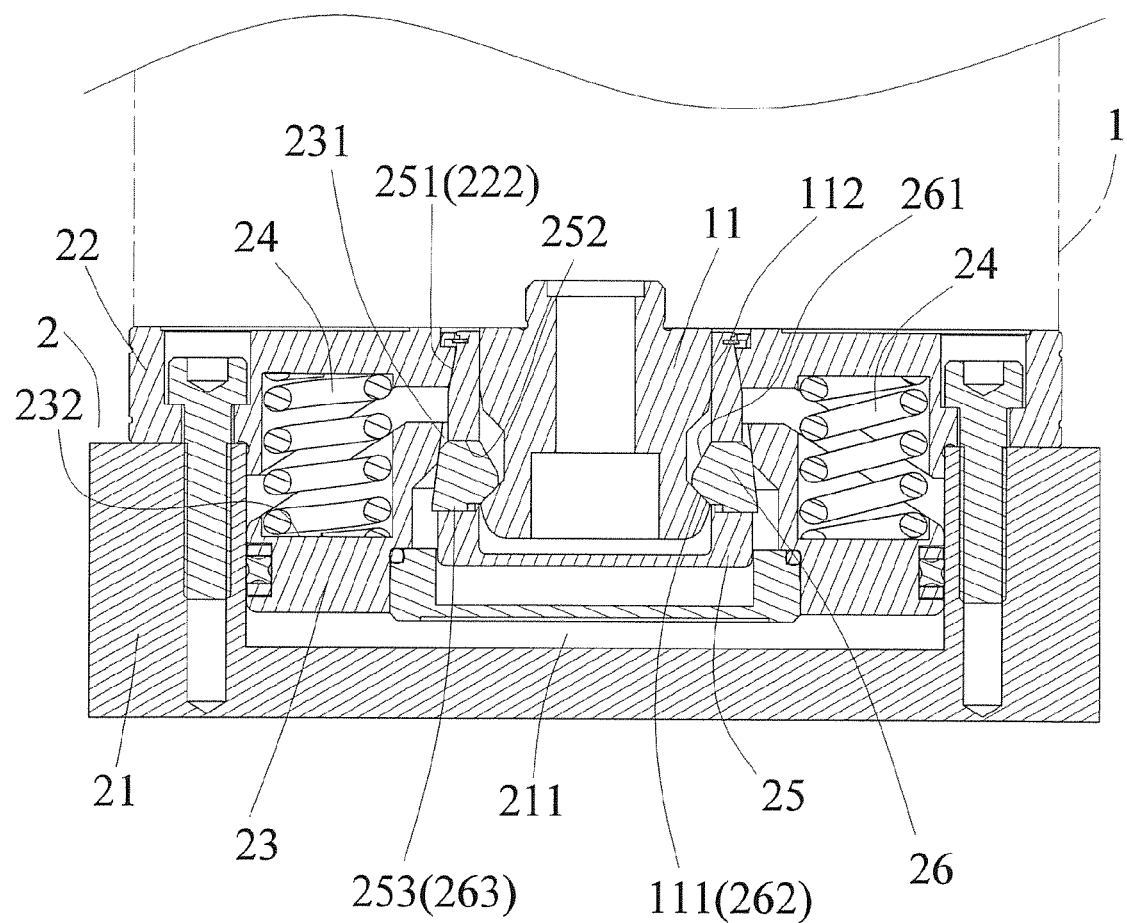
FIG. 5 is a schematic sectional view showing the workpiece pallet is clamped by the chuck of the embodiment (I) of the present invention.
Figure 6:
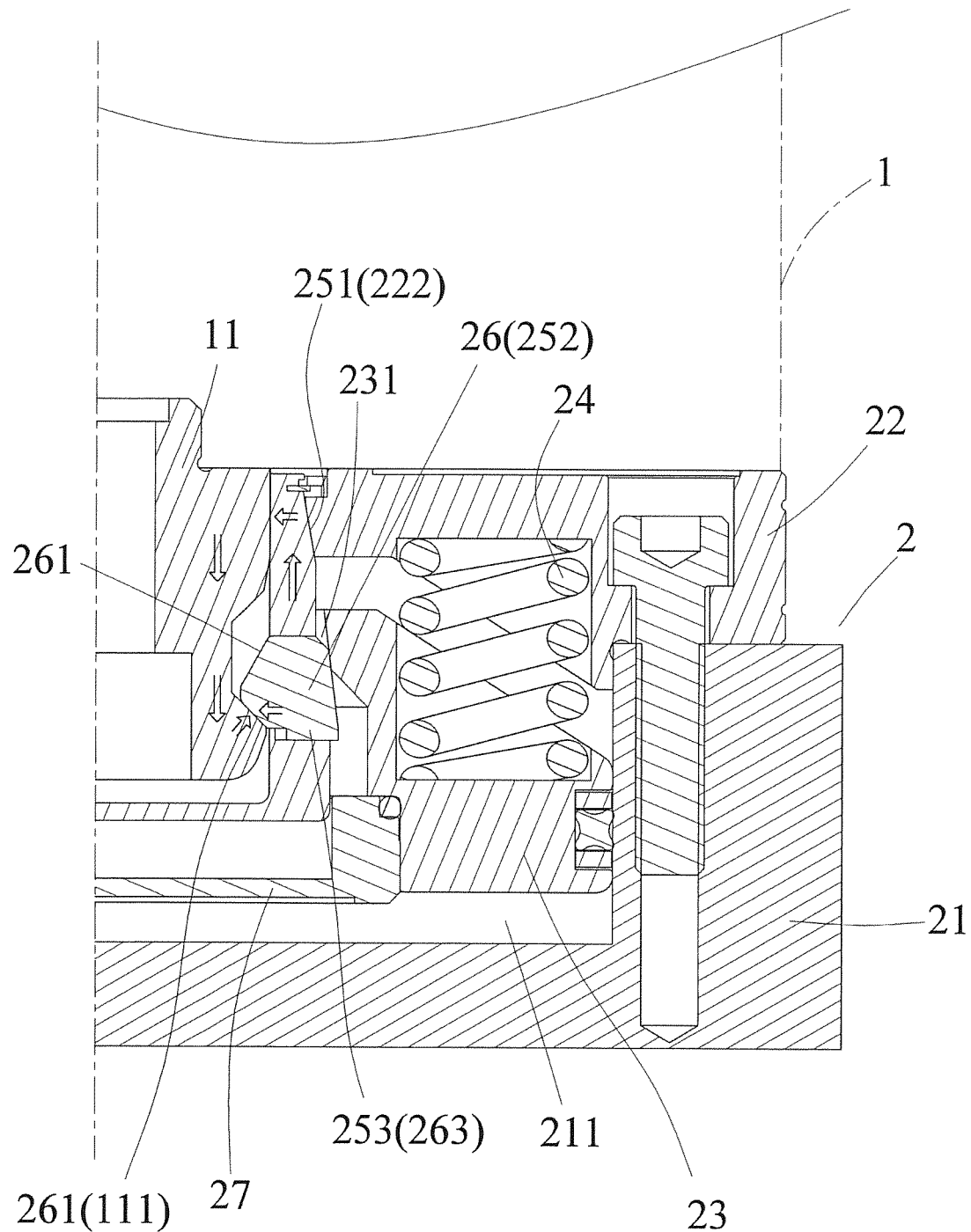
FIG. 6 is a schematic partial enlarged view of FIG. 5 of the present invention.

Please also refer to FIGS. 5 and 6, the engaging bevel surface (111) on the head part of the central post (11) is inclined toward inner side. When the workpiece pallet (1) is assembled on the chuck (2), the central post (11) is inserted in the bore (221) of the top seat (22) of the chuck (2) as mentioned above, so as to enter into internal space of the movable socket (25). At this moment, power is released in the action chamber (211) of the base (21) so that the spring member (24) on the piston seat (23) is expanded between the top seat (22) and the piston seat (23), and then the piston seat (23) is allowed to displace downward. The downward displacement of the piston seat (23) allows the movable detents (26) to move toward the center. The smooth horizontal displacement of the movable detents (26) can be facilitated by providing ridges (263) respectively on the bottoms of the movable detents (26) to slide on corresponding grooves (253) provided respectively on the bottoms of the slots (252).

The displacement of the movable detents (26) allows the second inclined surface (262) located lower side thereof to abut against the corresponding engaging bevel surface (111) of the central post (11). In view of this action, the movable socket (25) floats slightly to displace upward, so that the annular inclined surface (251) located outside the movable socket (25) clamps inward by the push action of the corresponding abutting annular surface (222) near the bore (221) of the top seat (22), and then the inside wall of the movable socket (25) will clamp the action annular surface (112) of the central post (11) so that the movable socket (25) will pull the central post (11) downward to clamp. Simultaneously, the bottom surface of the workpiece pallet (1) will abut against the the end surface of the top seat (22) closely so as to achieve zero clamping effect between the workpiece pallet (1) and the chuck (2).

Figure 7:
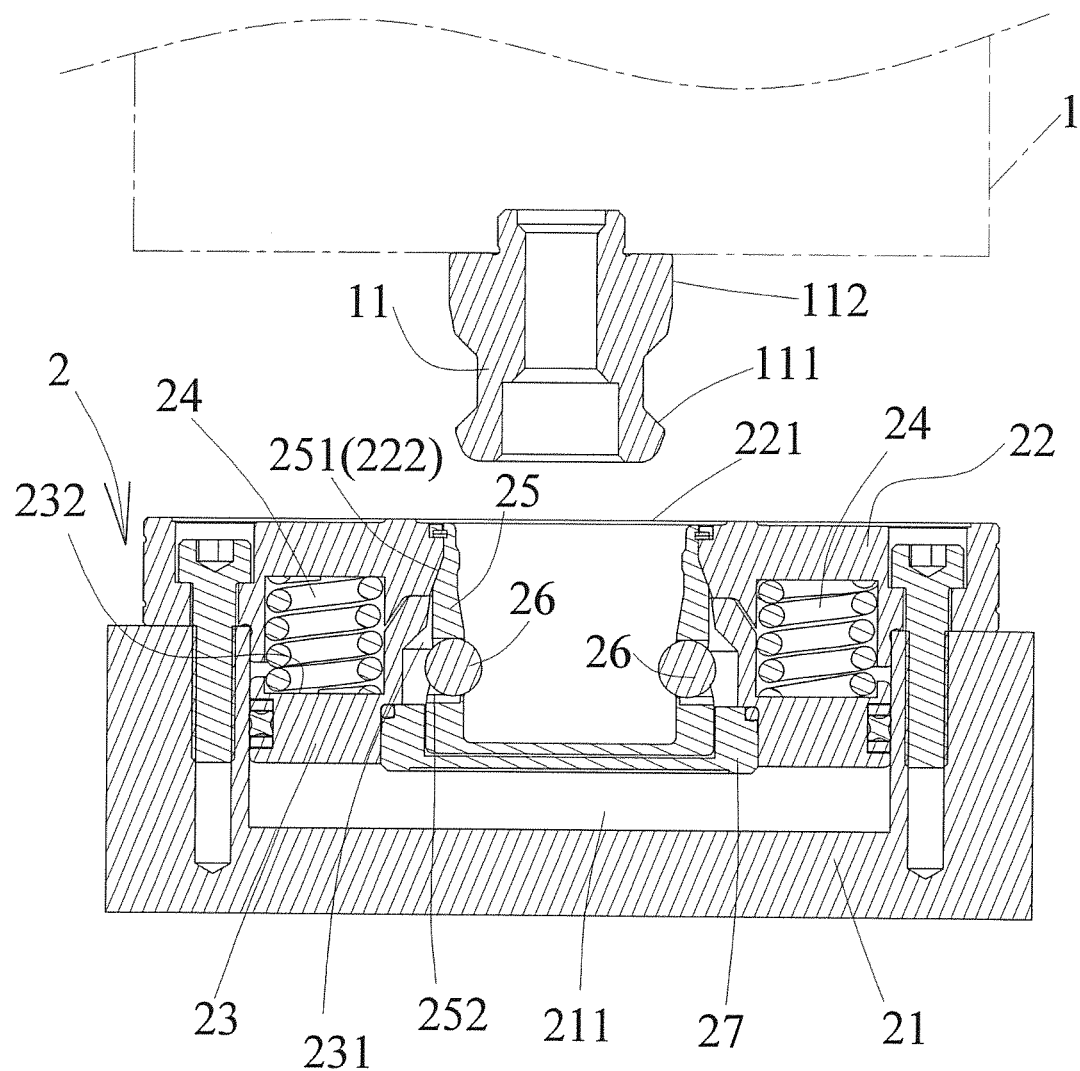
FIG. 7 is a schematic sectional view showing unassembled stated of the workpiece pallet and the chuck of the embodiment (II) of the present invention.
Figure 8:
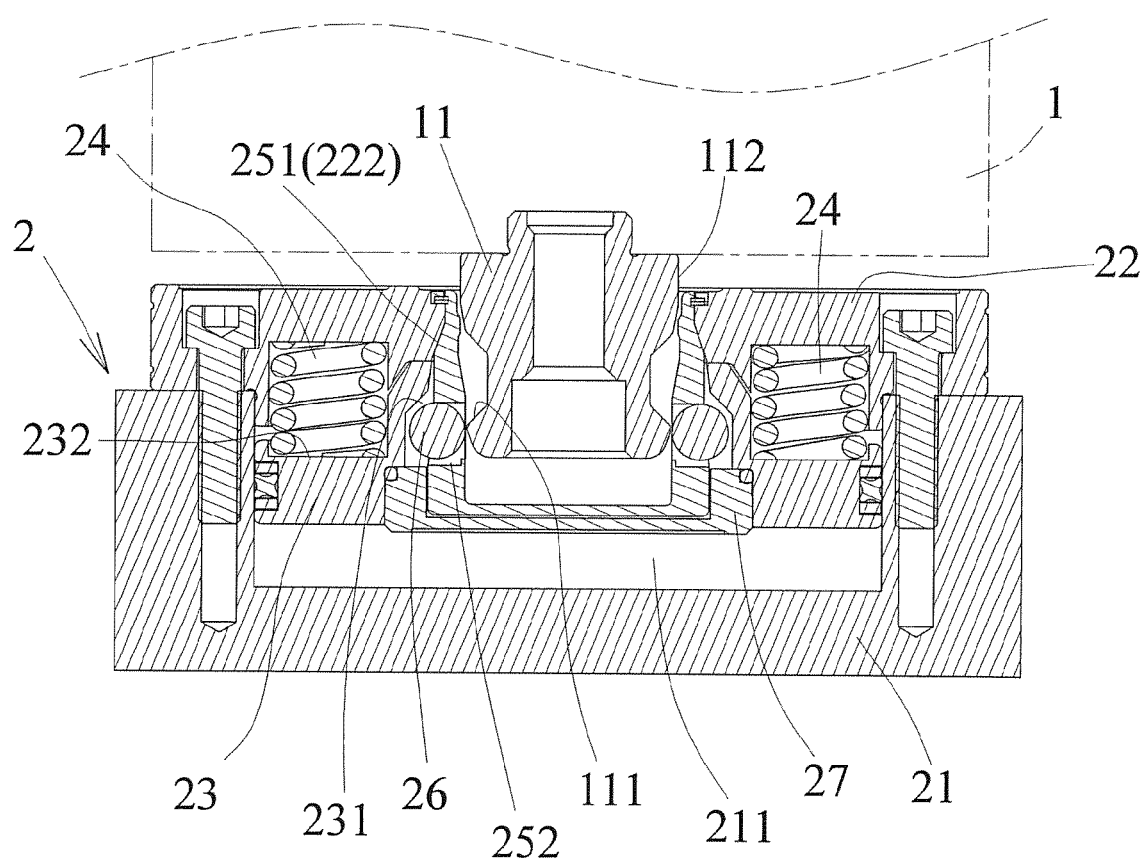
FIG. 8 is a schematic sectional view showing the action of inserting the workpiece pallet into the chuck of the embodiment (II) of the present invention.

Referring to FIGS. 7 to 10 too, a second embodiment of the present invention, in which ball is employed as the movable detents (26), will be described. Actual implementation mode of present embodiment is substantially the same as the implementation of the first embodiment, and the detail of the process will be explained later. As shown in FIG. 7, when the workpiece pallet (1) is not yet assembled with the chuck (2), the action chamber (211) within the base (21) of the chuck (2) is inputted with power (hydraulic oil) to push the piston seat (23) upward (i.e., normally open state). At this moment, the uprising movable seat (23) compresses the spring members (24) and detaches from the detention with the movable detents (26), so that the movable detents (26) on the movable socket (25) have spaces for displacement in the slots (252). As ball is employed as movable detent (26), the head of the central post (11) can correspondingly push against the surface of each ball under unconstraining state of the movable detents (26) so that the movable detents (26) are moved backward and fitted into the movable socket (25), as shown in FIG. 8.

Figure 9:
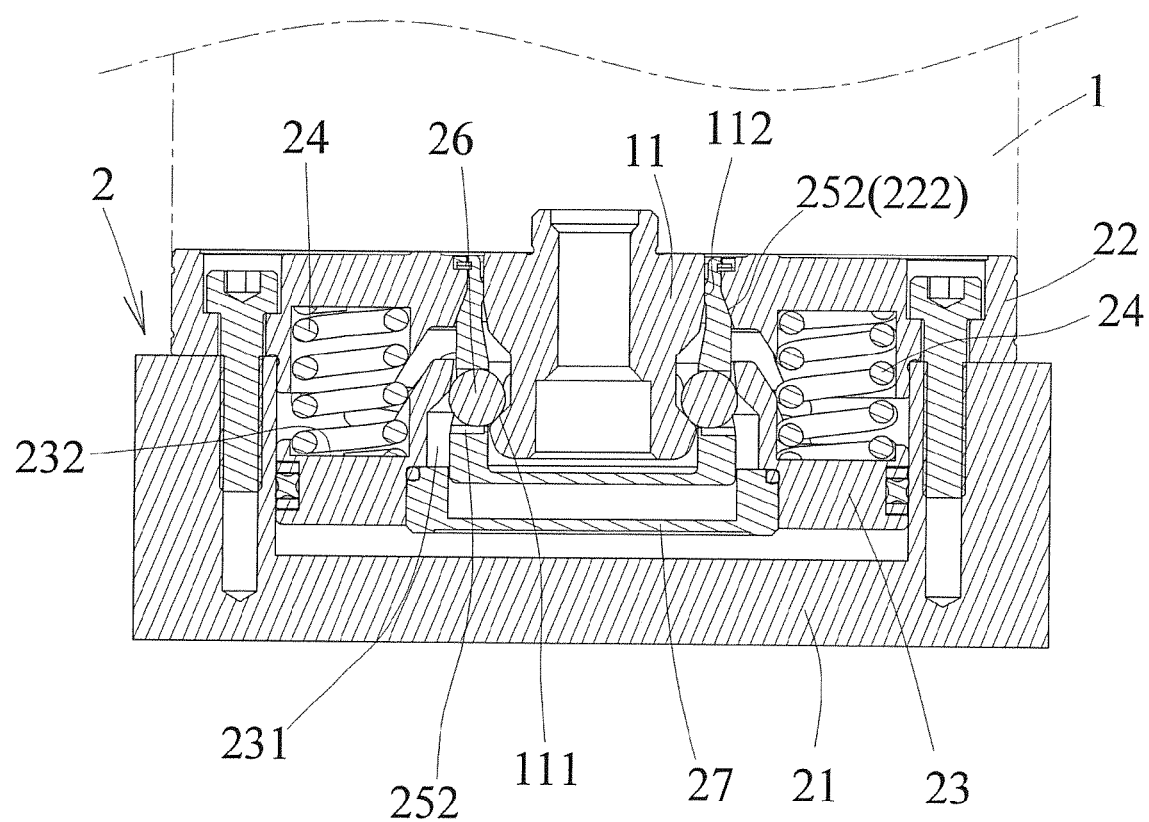
FIG. 9 is a schematic sectional view showing the workpiece pallet is clamped by the chuck of the embodiment (II) of the present invention.
Figure 10:
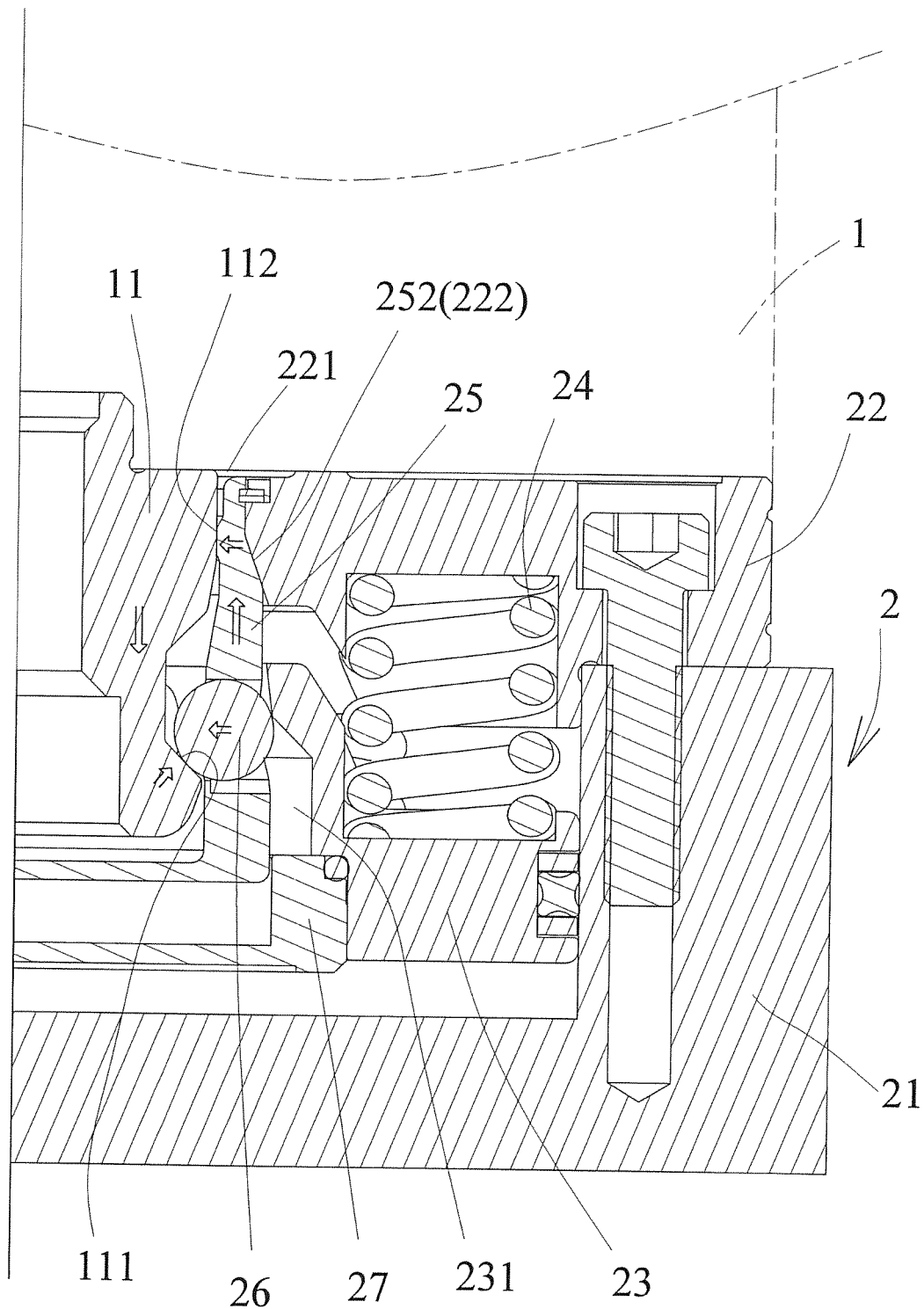
FIG. 10 is a schematic partial enlarged view of FIG. 9 of the present invention.

Referring to FIGS. 9 and 10 too, the engaging bevel surface (111) on the head part of the central post (11) is inclined toward inner side. When the workpiece pallet (1) is assembled on the chuck (2), the central post (11) is inserted in the bore (221) of the top seat (22) of the chuck (2) as mentioned above, so as to enter into internal space of the movable socket (25). At this moment, power is released in the action chamber (211) of the base (21) so that the spring members (24) on the piston seat (23) are expanded between the top seat (22) and the piston seat (23), and then the piston seat (23) is allowed to displace downward. The downward displacement of the piston seat (23) allows the movable detents (26) to move toward the center. The smooth horizontal displacement of the movable detents (26) can be facilitated by providing ridges (263) respectively on the bottoms of the movable detents (26) to slide on corresponding grooves (253) respectively on the bottoms of the slots (252).

The displacement of the movable detents (26) allows the spherical surface of each ball to abut against the corresponding engaging bevel surface (111) of the central post (11). In view of this action, the movable socket (25) floats slightly to displace upward, so that the annular inclined surface (251) located outside the movable socket (25) clamps inward by the push action of the corresponding abutting annular surface (222) near the bore (221) of the top seat (22), and then the inside wall of the movable socket (25) will clamp the action annular surface (112) of the central post (11) so that the movable socket (25) will pull the central post (11) downward to clamp. Simultaneously, the bottom surface of the workpiece pallet (1) will abut against the end surface of the top seat (22) closely so as to achieve zero clamping effect between the workpiece pallet (1) and the chuck (2).

By employing ball as the movable detent (26), the central post (11) of the workpiece pallet (1) similarly can be fitted into the movable socket (25). The inward displacement of the movable detents (26) can clamp the central post (11) so as to allow the movable socket (25) floating upward slightly, and then the inclined annular surface (251) of the movable socket (25) interacts with the opening of the top seat (22) to push the movable socket (25) downward so as to clamp the central post (11) firmly. In this manner, zero clamping effect between the workpiece pallet (1) and the chuck (2) can be achieved. As the ball can clamp the corresponding engaging bevel surface (111) of the central post (11) in point-contact mode, the ball can achieve the clamping effect of bearing greater tensile strength.

It is apparent from the above description concerning the component constitution and implementation, the present invention has the following advantages when comparing with conventional structure.

1. According to the floating type clamping mechanism of the present invention, a floating type movable socket is provided in the chuck in such a manner that it can float slightly upward by clamping action so as to enable the central post to be pressed downward and clamped firmly. In this manner, zero clamping effect between the workpiece pallet and the chuck can be achieved.

2. According to the floating type clamping mechanism of the present invention, the workpiece pallet is not affected by machining process to shake after the workpiece pallet is firmly fixed with the chuck. Therefore, the size of workpiece in processing can be precisely ensured.

3. According to the floating type clamping mechanism of the present invention, movable detents are provided in the movable socket to correspondingly clamp the central post of the chuck. The surface contact between the second inclined surface of the movable detents and the engaging bevel surface of the central post can effectively protect the engaging bevel surface from damaging under big clamping force, hence the stability and prolonged service life of the central post can be ensured.

4. According to the floating type clamping mechanism of the present invention, the central post of the workpiece pallet can be effectively and stably clamped by the floating type movable socket provided in the chuck, without the need of machining each of constitution components by time-consuming and costly effort to precise size as in prior art. Therefore, the present invention has the advantages of reducing costs, save labor hour and other economic benefits.

While the present invention has been described by preferred embodiment in conjunction with accompanying drawings, it should be understood that the embodiments and the drawings are merely for descriptive and illustrative purpose, not intended for restriction of the scope of the present invention. Equivalent variations and modifications conducted by person skilled in the art without departing from the spirit and scope of the present invention should be considered to be still within the scope of the present invention.

What is claimed is:

1. A floating type clamping mechanism, mainly having a workpiece pallet for fixing a workpiece thereon and a chuck, a central post being provided to extend from a bottom surface of the workpiece pallet, a head of the central post having an engaging bevel surface and an action annular surface of the central post being disposed adjacent to the bottom surface of the workpiece pallet, and the chuck being releasably coupled with the central post, wherein the chuck comprises:

a base having an action chamber formed at its center;

a top seat correspondingly fastened to an open end of the base, the top seat having an axially directed bore formed therethrough in open communication with the action chamber and an inclined abutting annular surface formed in an inner ring surface of an opening of the bore;

a piston seat provided within the action chamber of the base, an aperture being provided at the center of the piston seat coaxial with the bore of the top seat and a plurality of receiving cavities being provided in radially spaced relationship around the aperture, each receiving cavity having a spring member mounted therein which correspondingly pushes against the top seat, the piston seat being driven by power to interact with the spring members in such a manner that the piston seat can be displaced up and down within the action chamber;

a movable socket provided within the central aperture of the piston seat and having an opening into which the central post of the workpiece pallet is received, the movable socket being axially displaceable within the central aperture and having an inclined annular surface provided on an upper outside surface thereof, displacement toward the opening of the bore of the top seat being limited by engagement between the inclined annular surface of the movable socket and the inclined abutting annular surface of the top seat, a plurality of slots being disposed around a side wall of the movable socket and a plurality of movable detents being provided respectively within the slots, wherein corresponding engagement between the plurality of detents and the engaging bevel surface of the central post displaces the movable socket to compressively clamp the action annular surface of the central post responsive to interaction between the inclined annular surface of the movable socket and the inclined abutting annular surface of the top seat; and a bottom cover correspondingly being press-fit into a bottom of the aperture of the piston seat.

2. The floating type clamping mechanism as claimed in claim 1, wherein each of the plurality of movable detents is a sliding block.

3. The floating type clamping mechanism as claimed in claim 2, wherein each of the plurality of slots of the movable socket having a groove formed therein and each sliding block has a ridge received in a corresponding one of the grooves so that the sliding blocks can move smoothly within the slots.

4. The floating type clamping mechanism as claimed in claim 2, wherein each of the sliding blocks has a first inclined surface and a second inclined surface respectively formed on an upper position and a lower position thereof, wherein the first inclined surface is pushed by the central post being inserted into the bore to displace the sliding blocks into the slots, and subsebsequently the second inclined surface of each sliding block abuts against the engaging bevel surface of the central post to thereby clampingly engage the central post.

5. The floating type clamping mechanism as claimed in claim 1, wherein each of the plurality of movable detents is a ball.

* * * * *